(12) United States Patent
Ankenman

(10) Patent No.: US 7,866,270 B2
(45) Date of Patent: Jan. 11, 2011

(54) TILLAGE SHANK WITH ADJUSTABLE DEPTH FERTILIZER TUBE

(75) Inventor: Thomas W. Ankenman, Hutchinson, KS (US)

(73) Assignee: Krause Corporation, Hutchinson, KS (US)

( * ) Notice: Subject to any disclaimer, the term of this patent is extended or adjusted under 35 U.S.C. 154(b) by 0 days.

(21) Appl. No.: 12/428,859

(22) Filed: Apr. 23, 2009

(65) Prior Publication Data

US 2010/0270043 A1 Oct. 28, 2010

(51) Int. Cl.
*A01C 7/00* (2006.01)

(52) U.S. Cl. .......................... 111/187; 111/34; 111/73; 172/138

(58) Field of Classification Search .................. 172/138, 172/139, 196, 438; 111/89, 96, 34, 39, 186–188, 111/104, 109, 111, 120, 123, 125, 52, 69, 111/161, 162, 170, 71, 73
See application file for complete search history.

(56) References Cited

U.S. PATENT DOCUMENTS

| | | | | |
|---|---|---|---|---|
| 609,354 | A * | 8/1898 | Keith | 111/45 |
| 2,713,836 | A * | 7/1955 | Ajero | 111/152 |
| 2,924,189 | A * | 2/1960 | McLeod | 111/187 |
| 3,749,177 | A * | 7/1973 | Keyser et al. | 172/44 |
| 4,686,914 | A * | 8/1987 | Schaaf et al. | 111/73 |
| 5,005,497 | A * | 4/1991 | Kolskog | 111/123 |
| 5,161,472 | A * | 11/1992 | Handy | 111/73 |
| 5,509,363 | A * | 4/1996 | Zimmerman | 111/157 |
| 5,623,997 | A | 4/1997 | Rawson et al. | |
| 6,142,085 | A * | 11/2000 | Drever et al. | 111/151 |
| 6,178,900 | B1 | 1/2001 | Dietrich, Sr. | |
| 6,397,767 | B1 * | 6/2002 | Dietrich, Sr. | 111/119 |

* cited by examiner

*Primary Examiner*—Robert E Pezzuto
*Assistant Examiner*—Matthew D Troutman
(74) *Attorney, Agent, or Firm*—Hovey Williams LLP

(57) ABSTRACT

A tillage shank assembly has one or more substance delivery tubes supported along the back edge of the generally upright shank of the assembly. A pair of side plates on opposite sides of the shank have rear margins that project rearwardly beyond the rear edge of the shank to define a protective gap within which the tubes are disposed. Laterally extending projections on the tubes are received within selected ones of a vertical series of holes in the side plates, depending upon the desired depth for the tubes. By temporarily removing a bolt that attaches the tops of the side plates to the shank, the side plates may be separated sufficiently to permit the projections of the tubes to be withdrawn from their current holes and reinserted into other holes to change their vertical locations. Replacing the bolt and tightening it down returns the side plates to their working positions.

20 Claims, 5 Drawing Sheets

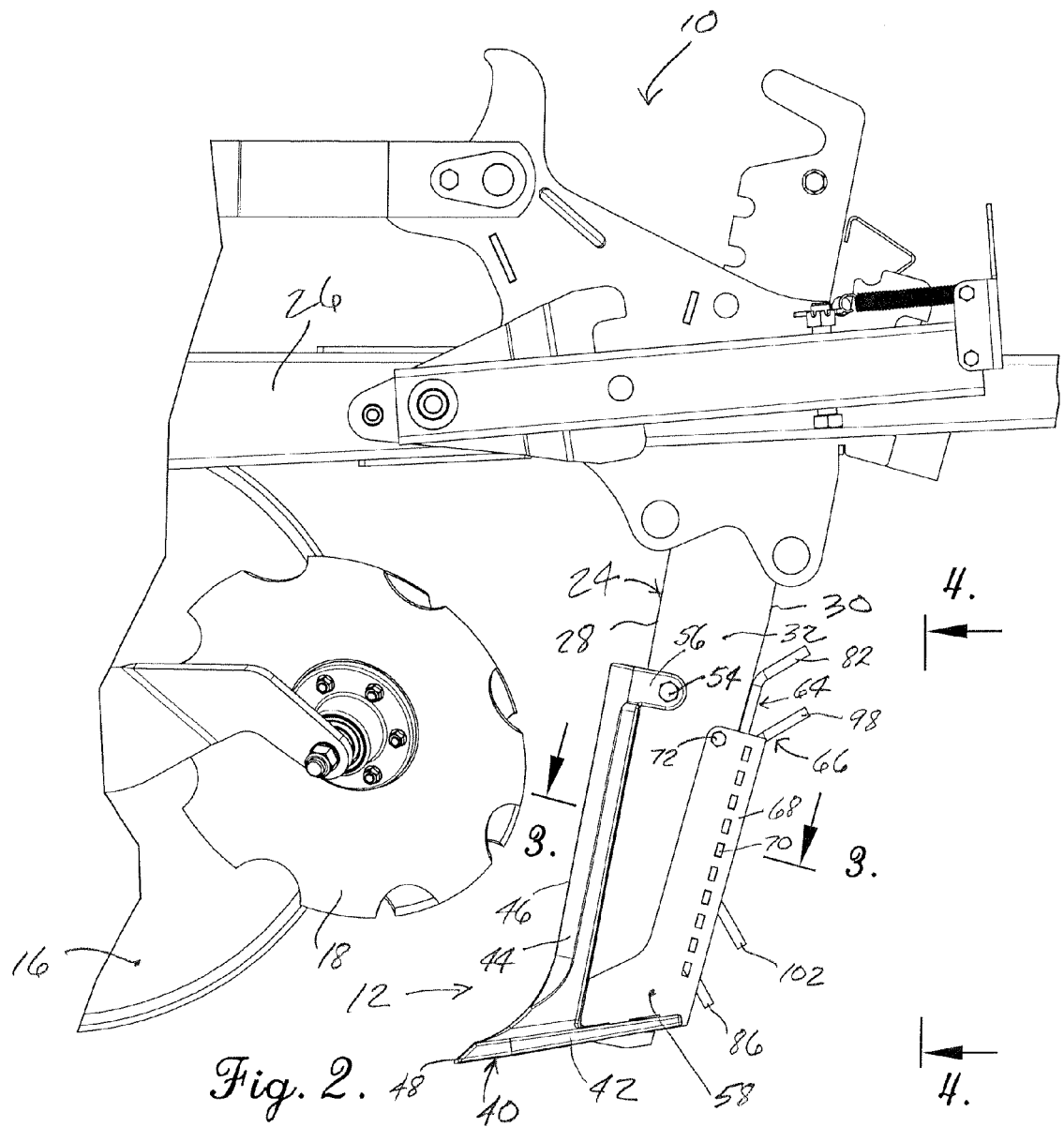
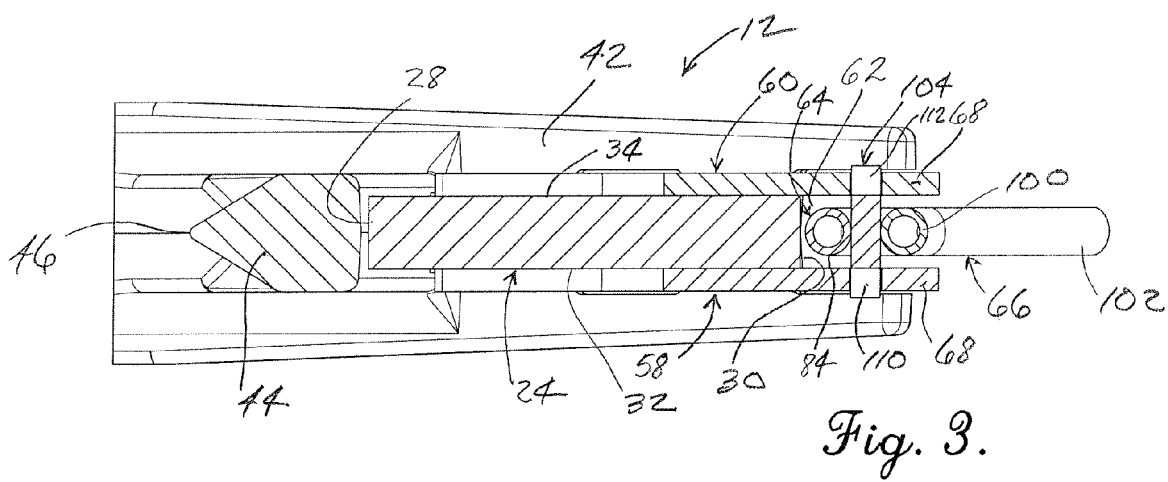

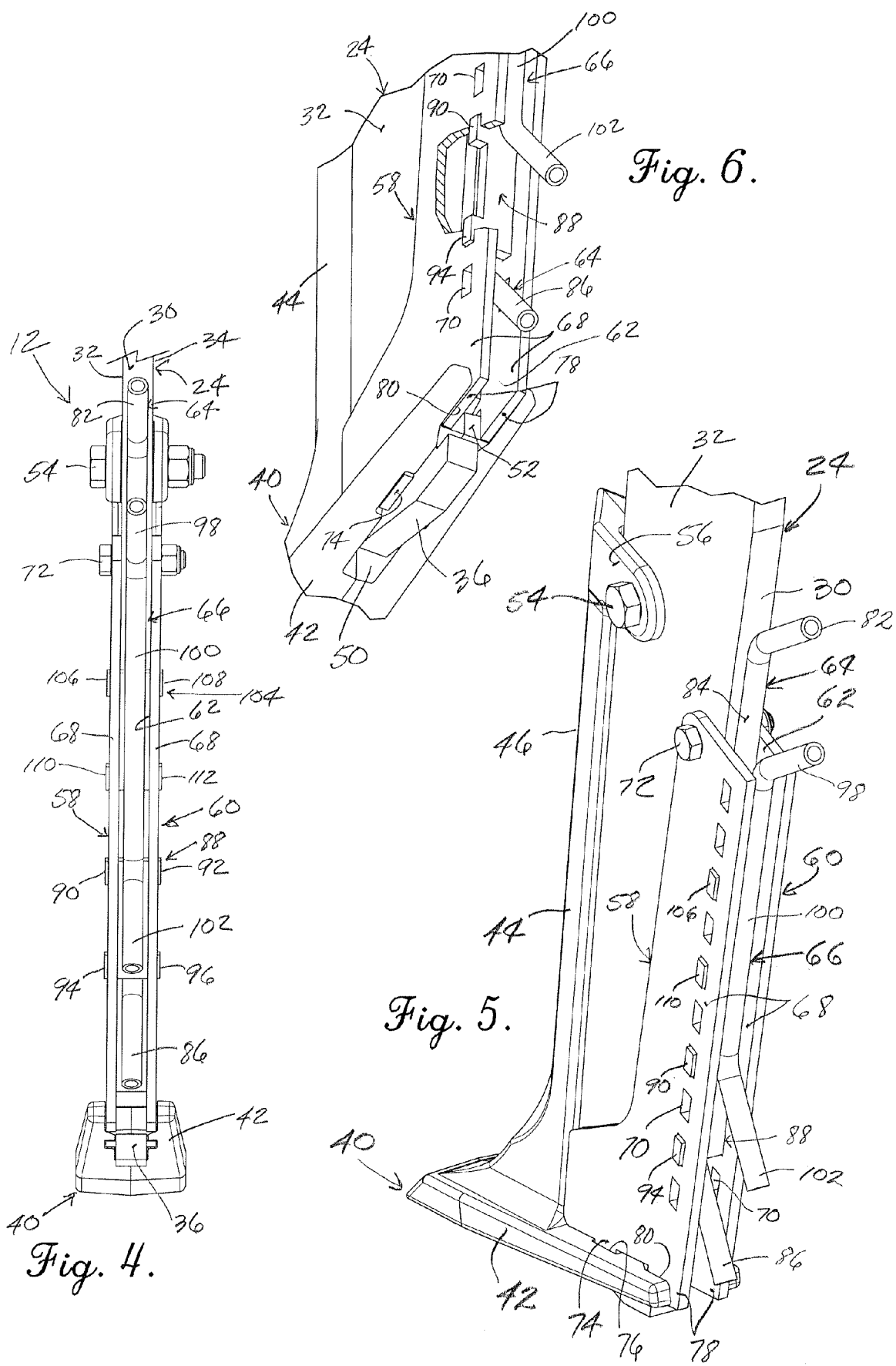

TILLAGE SHANK WITH ADJUSTABLE DEPTH FERTILIZER TUBE

TECHNICAL FIELD

The present invention relates to tillage equipment and, more particularly, to a tillage shank assembly having one or more substance delivery tubes that may be depth-adjusted relative to the shank of the assembly to correspondingly adjust the depth at which a substance such as fertilizer may be deposited below the surface of the ground.

BACKGROUND AND SUMMARY

Tillage shanks are sometimes provided with a delivery tube for the purpose of placing fertilizer or other substance below the surface of the ground at the same time the moving shank is cutting through and working the soil. Some commercially available shank assemblies include a tube that has been permanently welded to the shank at a fixed location. In other situations, the farmer may obtain tubes separately from the shanks and then weld the tubes to the shanks.

A problem with the welded-on design is that if the farmer desires to apply fertilizer at different depths in varying conditions, he must change the depth of the shank as well, whether changing the shank depth is optimum for the situation at hand or not. Some commercially available conventional units provide fertilizer tubes that can be adjusted relative to the shank, but such adjustments are difficult to make and time-consuming.

Accordingly, an important object of the present invention is to provide a way of quickly and conveniently adjusting the depth of the one or more delivery tubes relative to the shank which carries it. Another important object of the invention is to provide the desired convenience and speed of adjustment while maintaining the one or more fertilizer tubes in protected positions on the shank so as to minimize abrasive wear on the tube as the shank assembly moves through the soil.

A further important object of the invention is to accomplish a way of adjustably mounting one or more tubes on the shank without exposing fastening devices to wear as the shank assembly moves through the soil.

BRIEF DESCRIPTION OF THE DRAWINGS

FIG. 2 is a fragmentary side elevational view of the tillage device of FIG. 1;

FIG. 3 is an enlarged transverse cross-sectional view through the shank assembly taken substantially along line 3-3 of FIG. 2;

FIG. 4 is a fragmentary rear elevational view taken substantially along sight line 4-4 of FIG. 2;

FIG. 5 is a fragmentary, left rear isometric view of the shank assembly;

FIG. 6 is a fragmentary, left, bottom isometric view of the shank assembly with portions broken away to reveal details of construction;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
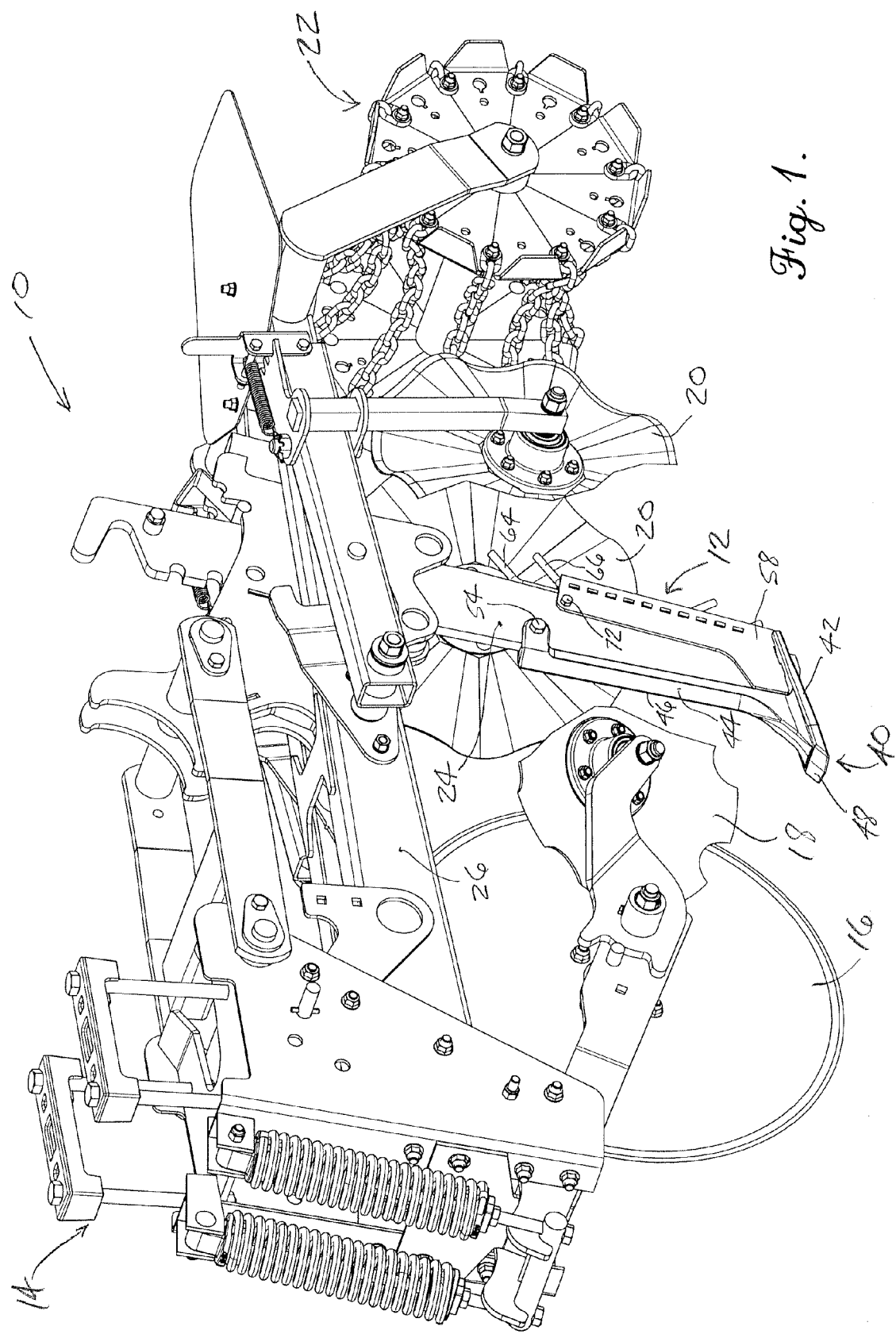
FIG. 1 is a left front isometric view of an exemplary tillage device utilizing a shank assembly having one or more adjustable fertilizer tubes in accordance with the principles of the present invention.
Figure 7:
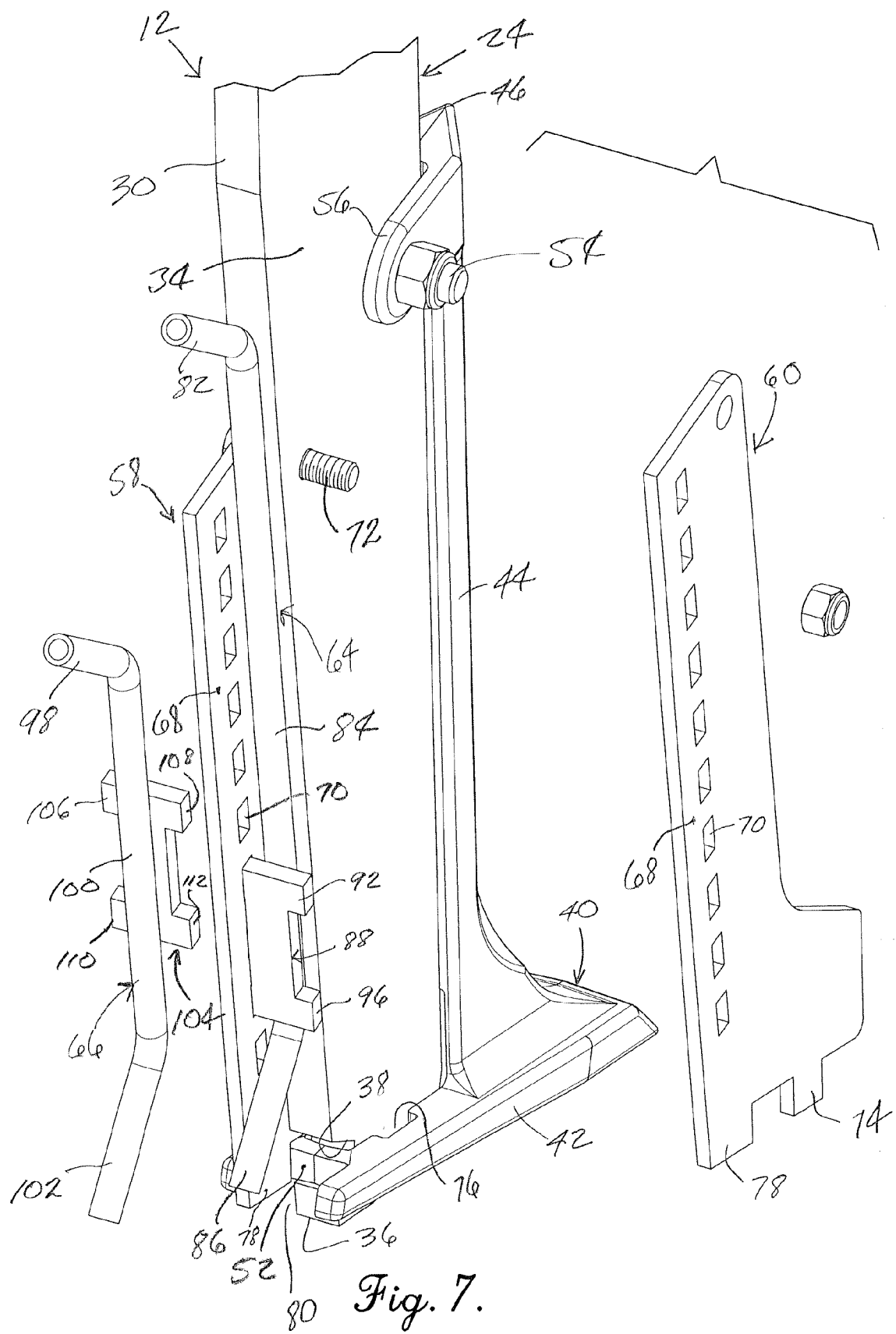
FIG. 7 is a fragmentary, right rear exploded view of the shank assembly illustrating details of construction.
Figure 8:
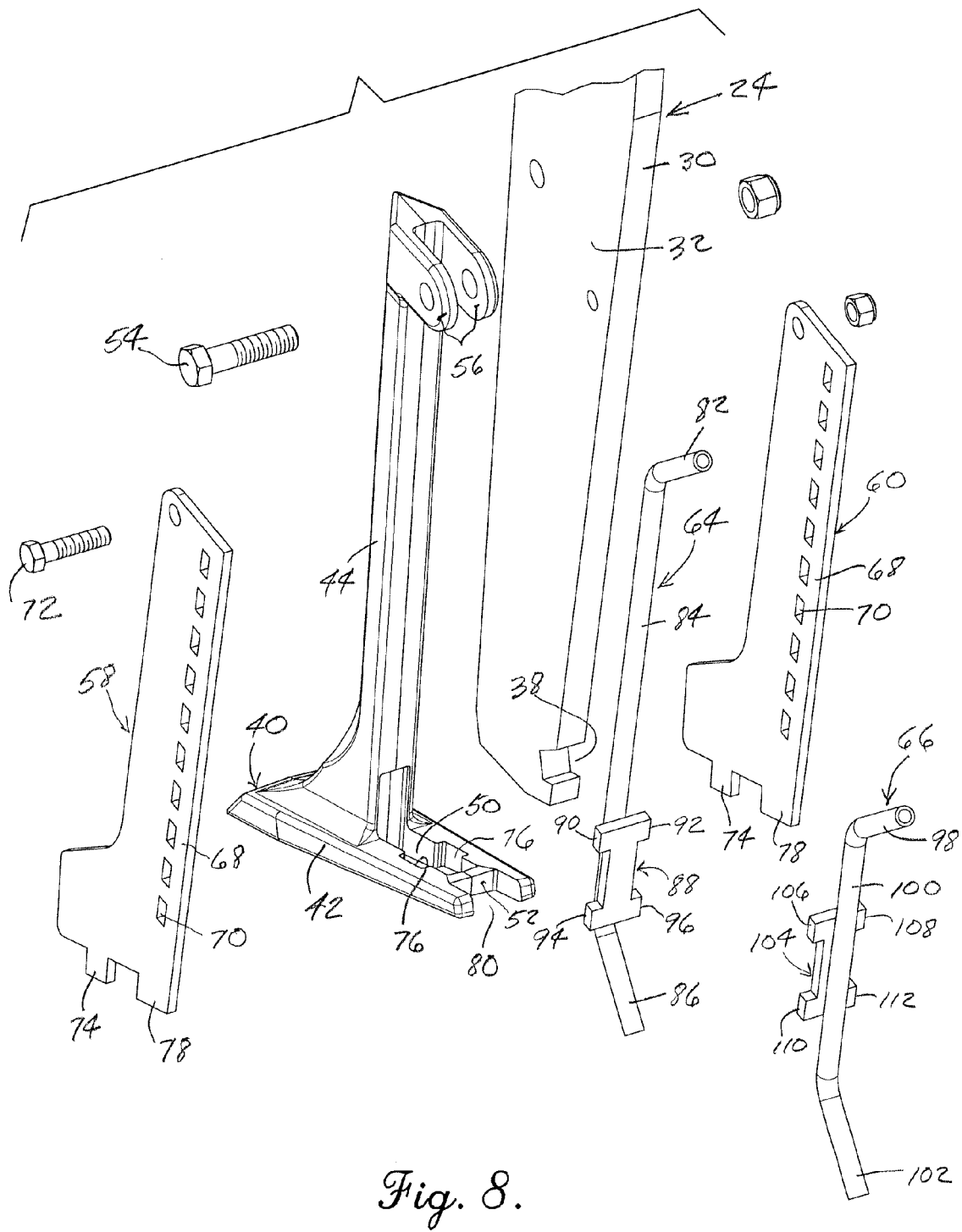
FIG. 8 is a fragmentary, left rear exploded view of the shank assembly.

The tillage device 10 of FIG. 1 has been selected for purposes of illustration only and is not to be considered limiting insofar as the scope of the present invention is concerned. In the illustrated embodiment, device 10 comprises a row unit that is particularly adapted for strip till applications in which a relatively narrow strip of soil is tilled and a berm is created for subsequently receiving planted seeds. In the context of the present invention, tillage device 10 includes a special shank assembly 12 having one or more depth-adjustable delivery tubes as hereinafter explained in more detail.

Generally speaking, tillage device 10 comprises one of a number of such devices adapted to be mounted upon a common, transversely extending tool bar (not shown) using mounting brackets 14 at the upper front extremity of the device. A single flat coulter blade 16 at the front of the device is adapted to cut through crop residue and make a slit in the soil as the device is advanced along a path of travel, while a pair of outwardly and rearwardly diverging, concavo-convex, serrated discs 18 (only one being shown) on opposite sides of coulter blade 16 adjacent its rear extremity engage the residue and soil and generally move it laterally outwardly. Shank assembly 12 follows behind coulter blade 16 and discs 18 in fore-and-aft alignment with coulter blade 16, moving within the slit created by coulter blade 16 to loosen and fracture the soil beneath the surface. In the illustrated embodiment, a pair of rearwardly converging, wavy coulters 20 behind shank assembly 12 gather loose, erupted soil centrally into a berm. Following wavy coulters 20 is a reel 22 for further pulverizing the soil of the berm without destroying its overall shape. In the illustrated embodiment, reel 22 takes the form of a chain reel as disclosed and claimed in co-pending application Ser. No. 12/051,420 filed Mar. 19, 2008 and titled "Chain Reel For Tillage Implement." The '420 application is hereby incorporated by reference into the present specification for the purpose of disclosing details of construction of chain reel 22 and other features of the tillage device 10.

With reference also to FIGS. 2-8, shank assembly 12 includes an elongated, generally upright, slightly rearwardly inclined, flat shank 24 that is adjustably supported by a horizontal frame 26 of device 10 for selective positioning in any one of a number of vertically adjusted positions. Shank 24 is rectangular in transverse cross-section, having a flat front edge 28, a flat rear edge 30, and a pair of wide, flat, left and right sides 32 and 34 respectively. Shank 24 also has a lowermost bottom edge 36 (FIG. 6) and is provided with a rearwardly facing notch 38 (FIG. 8) in rear edge 30 near bottom edge 36.

Shank assembly 12 further includes a point or shoe broadly denoted by the numeral 40 and detachably secured to shank 24. Point 40 is designed to make the primary contacting engagement with the soil along front edge 28 instead of shank 24 itself so as to avoid premature wear of edge 28. Thus, point 40 is constructed of a hardened material and is designed to be a replaceable unit.

Point 40 is generally L-shaped when viewed in side elevation and includes a generally horizontal leg comprising a base 42 and a generally upright leg comprising a front edge guard 44. Guard 44 and base 42 are integrally connected parts of a single, L-shaped unit. Guard 44 is slightly wider than front edge 28 of shank 24 and butts up against front edge 28 when point 40 is in place. A generally upright beveled leading edge 46 of guard 44 serves to cut through the soil in the slit made by coulter 16 and to progressively widen such slit to permit the passage therethrough of the remaining width of shank assembly 12.

In the illustrated embodiment, base 42 has a relatively broad, flat chisel nose 48 that progressively transitions to leading edge 46. Base 42 is also substantially wider than guard 44 and shank 24 so as to present a pair of shelf-like wing portions that lead rearwardly from chisel nose 48 and project laterally outwardly from opposite sides of shank 24. Immediately behind guard 44 within base 42 is a centrally disposed opening 50 (FIG. 8) that receives the lower end portion of shank 24 and through which bottom edge 36 projects. A rear cross bar 52 defines the rear extremity of opening 50 and spans the two opposite wing portions of base 42 behind opening 50. Notch 38 in shank 24 receives cross bar 52 so as to properly locate base 42 relative to the lower end of shank 24 and to provide a sturdy interconnection therebetween. At the upper end of guard 44, point 40 is held on shank 24 by a transverse bolt 54 passing through shank 24 and a pair of ears 56 that project rearwardly from guard 44 and embrace opposite sides of shank 24.

Shank assembly 12 further includes a pair of generally L-shaped, flat, side shield plates 58 and 60 held on opposite sides 32, 34 of shank 24. Plates 58, 60 are disposed in such a position relative to shank 24 that they project rearwardly beyond shank rear edge 30 and cooperatively define a gap or generally U-shaped channel 62 immediately behind rear edge 30. Such gap 62 is adapted to receive and protectively house a pair of generally upright delivery tubes 64 and 66 for fertilizer or other substances.

Side plates 58, 60 each have a rear margin 68 that projects rearwardly beyond rear shank edge 30 for use in defining the gap 62. Additionally, each rear margin 68 includes a generally vertically extending series of rectangular holes 70 that serve as part of the means for adjustably supporting tubes 64, 66 as hereinafter explained in more detail. The upper ends of side plates 58, 60 are secured to shank 24 by a common transverse bolt 72 at a location determined to be normally above the surface of the ground when the shank assembly is in use. A downwardly projecting tab 74 at the lower extremity of each side plate 58, 60 fits into a corresponding side notch 76 in opening 50 to help in retaining the side plate interlocked with base 42. A second downwardly projecting tab 78 at the lower end of each side plate 58, 60 is spaced rearwardly from front tab 74 and is received within a rearwardly opening recess 80 in the rear end of base 42 immediately behind cross bar 52. Thus, the lower ends of side plates 58, 60 are securely held in place and interlocked with base 42 without the use of transverse fasteners or the like passing through shank 24 and projecting outwardly beyond the outer surfaces of plates 58, 60 in a region that would be susceptible to abrasive wear from the soil.

It will be appreciated that in the illustrated embodiment, a pair of fertilizer tubes 64 and 66 are illustrated. However, shank assembly 12 could be provided with only one of such tubes, if desired. The advantage of two tubes, of course, is that two different types of materials may be delivered and, as will be seen, the delivery depths of the two tubes can be adjusted relative to each other, as well as relative to shank 24.

Front tube 64 is generally C-shaped, presenting an upper inlet end 82 that projects upwardly and rearwardly from rear edge 30 of shank 24 for connection with a delivery hose or the like (not shown) from a source of material supply. A straight, intermediate portion 84 of tube 64 lies generally against rear edge 30, and an outturned lower end 86 of tube 64 serves as a discharge end thereof.

In the illustrated embodiment, tube 64 is preferably constructed of metal, but that is not a requirement. Welded or otherwise secured to the rear face of intermediate tube portion 84 is a generally I-shaped, flat retainer 88 having a pair of upper oppositely projecting projections 90, 92 and a pair of lower oppositely projecting projections 94, 96. Projections 90-96 are shaped complementally with respect to holes 70 and are selectively receivable within a corresponding vertically spaced pair of such holes. Preferably, the vertical distance between the upper projections 90, 92 and lower projections 94, 96, is twice the distance between adjacent ones of the holes 70 in each series such that a "vacant" hole 70 is provided between each pair of holes occupied by projections 90, 94 and 92, 96. This provides stable support for tube 64 within gap 62.

In a similar manner, rear tube 66, which is shorter in overall length than tube 64, is generally C-shaped and has an upper, outturned inlet end 98 adapted to be coupled with a hose or other conduit (not shown) leading from a source of material supply. A straight intermediate portion 100 is adapted to be disposed within gap 62 behind the line of holes 70, and an outturned, lower discharge end 102 directs materials into the ground. In the illustrated embodiment, tube 66 is preferably constructed of metal, although such is not required.

Welded or otherwise affixed to the front surface of intermediate portion 100 is a generally I-shaped, flat retainer 104 of identical configuration to retainer 88. Retainer 104 has a pair of outwardly oppositely projecting upper projections 106 and 108, and a lower pair of oppositely outwardly projecting lower projections 110 and 112. Projections 106-112 are configured complementally with holes 70 so as to be matingly receivable therein.

It will be noted that retainer 88 of front tube 64 is disclosed on the rear surface of that tube, while retainer 104 of tube 66 is located on the front face of tube 66. Consequently, even though rear tube 66 is disposed behind front tube 64, retainers 88 and 104 are disposed within the same vertical plane, one above the other. Thus, both retainers 88 and 104 utilize the same series of holes 70 so as to simplify construction and usage. Retainer 104 of rear tube 66 is located higher on that tube than retainer 88 is on front tube 64. Therefore, retainer 104 uses holes 70 in the upper half of the series while retainer 88 utilizes holes 70 in the lower half of the series. Like the retainer 88, retainer 104 has its upper projections 106, 108 spaced above its lower projections 110, 112 by a distance that is twice the distance between adjacent ones of holes 70 in the series.

When side plates 58, 60 are in their working positions, fully secured to shank 24 by bolt 72 as illustrated in FIGS. 1-6, tubes 64 and 66 are securely retained with gap 62 by the interengagement of retainers 88, 104 with holes 70. If it is then desired to adjust the depth of either or both tubes 64, 66 relative to shank 24, bolt 72 is removed to enable plates 58, 60 to be separated from one another to a certain extent by spreading their upper ends apart while their lower tabs 74, 78 remain within their respective notches 76 and recess 80. With plates 58, 60 flared out in this manner, the projections of the corresponding tube 60 and/or 64 may be withdrawn from their current holes 70 and moved to a new set of higher or lower holes as desired. Side plates 58, 60 are then squeezed back together and bolt 72 is re-inserted and tightened down, returning plates 58, 60 to their working positions and readying shank assembly 12 for use.

It will therefore be appreciated that the above-described construction allows for the relatively quick and easy adjustment of either or both of the dispensing tubes 64, 66 relative to shank 24 without requiring that the running depth of shank 24 be adjusted. Moreover, side plates 58, 60 protectively enclose delivery tubes 64, 66 in critical areas that would otherwise be subject to premature wear from soil abrasion. Additionally, the absence of fasteners for side plates 58, 60 and dispensing tubes 64, 66 in the area below the ground surface eliminates wear of such fasteners.

It will also be appreciated that in the event any of the components of shank assembly 12 require replacement, such can be accomplished quickly and easily, with a minimum of effort. For example, side plates 58, 60 can be easily replaced by simply removing one bolt (bolt 72). Likewise, point 40 can be replaced by simply removing bolt 54.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A tillage shank assembly comprising:
   an elongated, generally upright shank having a pair of opposite sides and a rear edge;
   a pair of plates extending along opposite sides of the shank to present upper and lower ends,
   said plates being coupled to the shank adjacent the lower ends and removably secured to the shank adjacent the upper ends so as to be releasably held in working positions,
   said plates being at least partially separable when released from the working positions, so that at least upper portions thereof are spaced further away from one another than when the plates are in the working positions,
   said pair of plates having rear margins projecting rearwardly beyond said rear edge of the shank to define a gap disposed between said rear margins and behind said rear edge of the shank; and
   at least one generally upright dispensing tube within said gap,
   said at least one tube and said plates cooperatively presenting interengagable structure disposed along the upper portions of the plates,
   said interengagable structure being engaged when the plates are in the working positions so as to vertically fix the at least one tube relative to the shank,
   said interengagable structure being disengaged when the plates are out of the working positions so as to permit vertical adjustment of the at least one tube relative to the plates to permit depth adjustment of the tube within said gap relative to the shank,
   said plates being configured to remain coupled to the shank adjacent the lower ends thereof as the plates are shifted into and out of the working positions, such that the upper portions of the plates are spread apart from one another when the plates are moved out of the working positions.

2. A shank assembly as claimed in claim 1,
   said interengagable structure including a plurality of vertically spaced support holes spaced along the upper portion of at least one of said plates,
   said interengagable structure further including a projection on the tube that is received within a selected one of said holes to support the at least one tube at a selected depth when the plates are in the working positions.

3. A shank assembly as claimed in claim 1,
   said interengagable structure including a plurality of vertically spaced support holes spaced along the upper portions of said plates in said rear margins thereof,
   said interengagable structure further including a pair of oppositely extending projections on the tube that are received within a pair of opposed, selected holes in the plates to support the at least one tube at a selected depth when the plates are in the working positions,
   said at least one tube being disengageable from a first selected pair of opposed holes and adjustably movable vertically for engagement with a second selected pair of opposed holes when the plates are out of the working positions.

4. A shank assembly as claimed in claim 3,
   said interengagable structure further including a second pair of oppositely extending projections on the tube that are spaced vertically from the first-mentioned pair of oppositely extending projections,
   both pairs of oppositely extending projections being concurrently received within corresponding opposed holes when the plates are held in said working positions.

5. A shank assembly as claimed in claim 4,
   further comprising a second dispensing tube in said gap disposed rearwardly adjacent said at least one tube,
   said second dispensing tube being vertically adjustably secured to said plates to permit independent depth adjustment of the second tube within said gap relative to said at least one dispensing tube.

6. A shank assembly as claimed in claim 5,
   said second tube having projections received within different ones of the plurality of support holes than the holes receiving the projections of said at least one tube.

7. A shank assembly as claimed in claim 6,
   the projections of said second tube being offset vertically from the projections of said at least one tube.

8. A shank assembly as claimed in claim 3,
   further comprising a second dispensing tube in said gap disposed rearwardly adjacent said at least one tube,
   said second dispensing tube being vertically adjustably secured to said plates to permit independent depth adjustment of the second tube within said gap relative to said at least one dispensing tube.

9. A shank assembly as claimed in claim 8,
   said second tube having projections received within different ones of the plurality of support holes than the holes receiving the projections of said at least one tube.

10. A shank assembly as claimed in claim 9,
    the projections of said second tube being offset vertically from the projections of said at least one tube.

11. A shank assembly as claimed in claim 1,
    further comprising a second dispensing tube in said gap disposed rearwardly adjacent said at least one tube,
    said second dispensing tube being vertically adjustably secured to said plates to permit independent depth adjustment of the second tube within said gap relative to said at least one dispensing tube.

12. A shank assembly as claimed in claim 11,
    said second tube having a projection received within a different one of the plurality of support holes than the hole receiving the projection of said at least one tube.

13. A shank assembly as claimed in claim 12,
    the projection of said second tube being offset vertically from the projection of said at least one tube.

14. A shank assembly as claimed in claim 1,
    further comprising a point secured to and disposed at the lower front end of the shank,
    said point including a base portion that extends along opposite sides of the shank and projects laterally outwardly in opposite directions therefrom, said plates having lowermost, downwardly extending tabs received in notches in said base portion and being devoid of one or more laterally outwardly projecting fasteners adjacent the base portion, said plates having at least one laterally outwardly projecting fastener adjacent the upper ends of the plates that secures the plates to the shank to releasably hold the plates in said working positions.

15. A shank assembly as claimed in claim 1, said plates having at least one laterally outwardly projecting fastener adjacent the upper ends of the plates that secures the plates to the shank to releasably hold the plates in said working positions.

16. A shank assembly as claimed in claim 2, each of said support holes presenting a generally polygonal shape, said projection presenting a shape to be substantially complementally received within the selected one of said holes.

17. A shank assembly as claimed in claim 2, said plurality of vertically spaced support holes being generally vertically linearly defined along the upper portion of the plate.

18. A shank assembly as claimed in claim 1,

Said plates being substantially pivotable relative to the shank about the lower ends thereof to shift into and out of the working positions.

19. A shank assembly as claimed in claim 18, said plates having lowermost, downwardly extending tabs adjacent the lower ends thereof, said tabs being received within corresponding notches in the shank assembly, with the shank assembly being devoid of one or more laterally outwardly projecting fasteners adjacent the lower ends of the plates.

20. A shank assembly as claimed in claim 1, said upper portions of the plates being defined substantially continuously from just above the coupled lower ends of the plates.

\* \* \* \* \*